United States Patent [19]

Shikakura

[11] Patent Number: 5,594,598
[45] Date of Patent: Jan. 14, 1997

[54] INFORMATION RECORDING APPARATUS HAVING VARIABLE COMPRESSION RATIO

[75] Inventor: Akihiro Shikakura, Kanagawa-ken, Japan

[73] Assignee: Canon Kabushiki Kaisha, Tokyo, Japan

[21] Appl. No.: 963,119

[22] Filed: Oct. 19, 1992

[51] Int. Cl.$^6$ .................................................. G11B 5/09
[52] U.S. Cl. ............................................. 360/49; 386/109
[58] Field of Search ................................ 360/32, 48, 49, 360/40, 67, 68, 13, 51, 33.1; 369/100, 32, 31.1; 358/347, 336, 335, 310; 340/136

[56] References Cited

U.S. PATENT DOCUMENTS

| | | | |
|---|---|---|---|
| 3,757,254 | 9/1973 | Takahashi et al. | 360/65 X |
| 4,546,342 | 10/1985 | Weaver et al. | 340/347 |
| 4,628,373 | 12/1986 | Takahashi et al. | 360/62 |
| 4,785,349 | 11/1988 | Keith et al. | 358/136 |
| 4,882,754 | 11/1989 | Weaver et al. | 360/61 X |
| 5,018,017 | 5/1991 | Sasaki et al. | 358/209 |
| 5,027,214 | 6/1991 | Fujimori | 358/209 |
| 5,032,927 | 7/1991 | Watanabe et al. | 358/335 |
| 5,194,995 | 3/1993 | Severtson et al. | 360/48 |
| 5,249,053 | 9/1993 | Jain | 358/209 |

*Primary Examiner*—Donald T. Hajec
*Assistant Examiner*—Thien Minh Le
*Attorney, Agent, or Firm*—Robin, Blecker, Daley & Driscoll

[57] ABSTRACT

An available recording capacity is determined from various factors such as the remaining recording capacity of a tape and the length of insert-recording time, and the amount of information to be recorded is also determined. On the basis of the information thus obtained, the compression ratio of variable-length coding is controlled so that information to be recorded can be reliably accommodated into an available recording capacity, whereby information of any time length can be recorded in a recording area of desired length. In addition, it is possible to prevent a problem such as destruction of another recording.

21 Claims, 4 Drawing Sheets

INFORMATION RECORDING APPARATUS HAVING VARIABLE COMPRESSION RATIO

BACKGROUND OF THE INVENTION

1. Field of the Invention

The present invention relates to an information recording apparatus and, more particularly, to an information recording apparatus capable of compressing information by variable-length coding or the like, as well as capable of varying the compression ratio at which the information is to be compressed.

2. Description of the Related Art

An image information recording or reproducing apparatus, such as a digital video tape recorder (VTR), is typically arranged to compress image information and record the compressed image information on a magnetic tape. In general, compression coding systems are classified into fixed-length coding and variable-length coding, and the variable-length coding has received special attention from the viewpoint of compression efficiency.

More specifically, in the variable-length coding, a code of reduced length can be assigned to data which occurs more frequently, so that the variable-length coding can achieve a higher compression ratio than the fixed-length coding. For this reason, development of compressed-signal recording apparatus using the variable-length coding has recently been performed because of such a high compression efficiency.

As is known, in a VTR using such a variable-length coding, the amount of image information inputted per unit time is always constant, and the amount of information recordable per unit time is likewise constant as long as the operation of the recording apparatus is constant. For this reason, a digital VTR is also proposed which is capable of managing its compression ratio so that the amount of recorded information can be always kept constant per predetermined time unit, i.e., per field (or frame).

The operation performed by this kind of VTR during the variable-length coding is apparently similar to that of a conventional analog VTR or that performed by a digital VTR during the fixed-length coding.

It is to be noted, however, that if the variable-length coding is employed, since it is necessary to perform compression according to a target compression ratio, a coding system having a compression ratio which can be flexibly varied must be adopted.

In addition, since a difference in image quality occurs depending upon the density of an image in the case of the VTR in which the amount of recorded information per field (or frame) is kept constant, a VTR may be considered of the type in which the amount of recorded information per field (or frame) is variable with the compression processing being fixed. In such a VTR, the compression ratio per field (or frame) also diversely varies depending on images. The VTR can, therefore, record an image signal of constantly stable image quality.

However, this kind of VTR encounters the following problem.

The VTR has the disadvantage that the amount of data per field (or frame) is not kept constant, so that it is difficult to achieve an insert-recording in which recorded image information for one or more pictures is replaced with image information indicative of another picture or other pictures. More specifically, no problem may occur if an image having data which is smaller in amount than that of an old recorded image is to be newly recorded in a recording area occupied by the old recorded image. However, if the former amount exceeds the latter amount, the recording of the new image will destruct information recorded in the succeeding recording area.

SUMMARY OF THE INVENTION

A primary object of the present invention which has been made in the light of the above-described background is, therefore, to realize a novel function which is useful in a coding system utilizing a variable compression ratio.

More specifically, the present invention is intended to provide a recording apparatus capable of freely selecting the time length, amount, or the like, of information to be recorded even if the available recording capacity of a recording medium is limited.

Another object of the present invention is to provide an information recording apparatus arranged to perform variable-length coding and capable of reliably recording a desired amount of information in a predetermined recording area on a recording medium.

To achieve the above-described objects, in accordance with one aspect of the present invention, there is provided an information recording apparatus which comprises inputting means for permitting input of information to be recorded, coding means for coding the information inputted through the inputting means, the coding means compressing the information at a compression ratio which is variable and outputting the compressed information, first generating means for generating first information relative to an amount of the information to be recorded, second generating means for generating second information relative to an available recording capacity, controlling means for controlling the compression ratio of the coding means in accordance with the first information and the second information, and recording means for recording the compressed information outputted from the coding means on a recording medium.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

Figure 1:
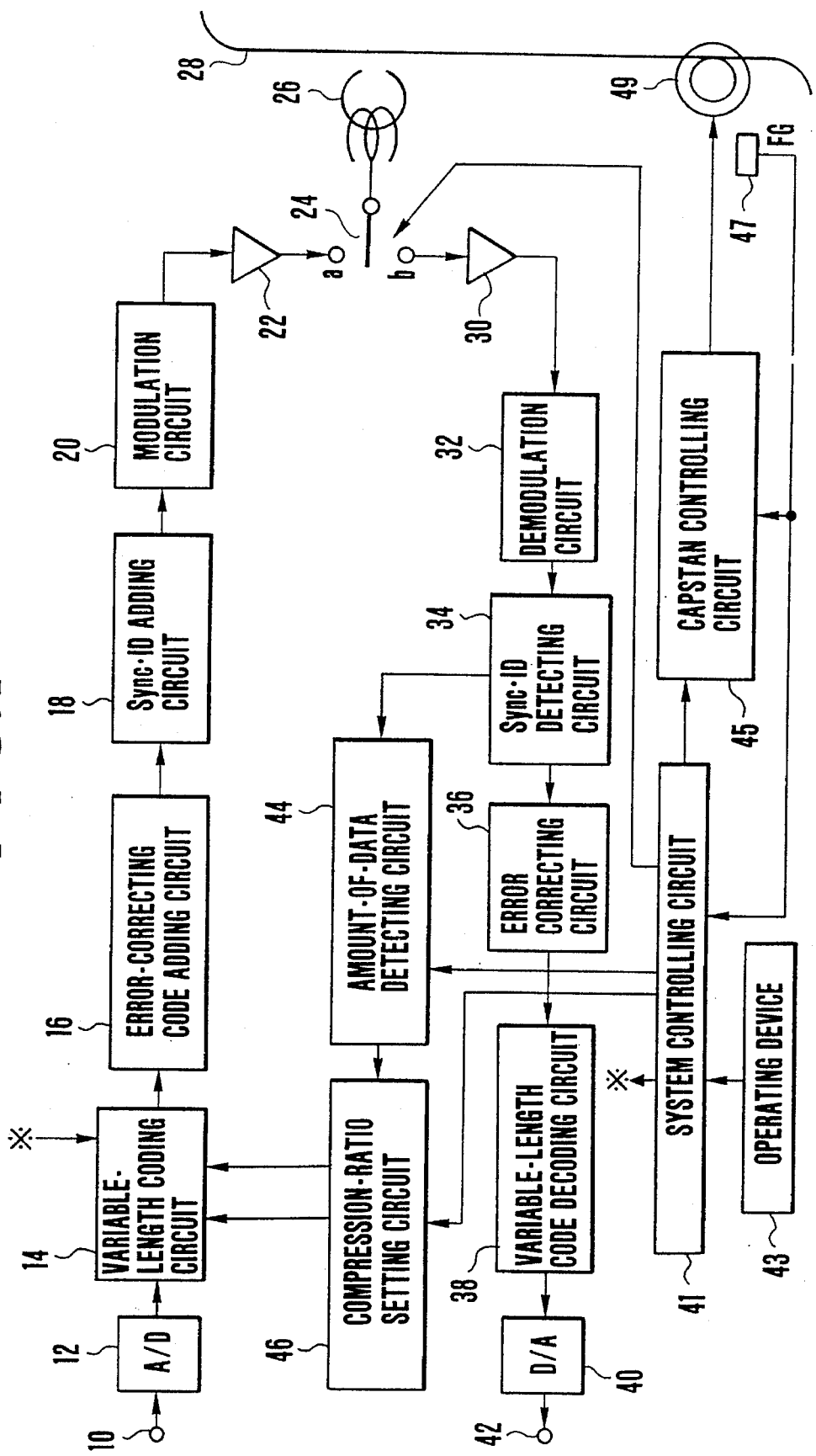
FIG. 1 is a block diagram schematically showing the entire arrangement of an information recording apparatus according to one embodiment of the present invention.

FIG. 1 is a block diagram schematically showing the arrangement of a recording apparatus according to a first embodiment of the present invention. The arrangement shown in FIG. 1 includes an input terminal 10 for permitting input of an image signal to be recorded, an A/D converter 12 for converting an image signal inputted through the input terminal 10 into a digital signal, a variable-length coding circuit 14 for encoding an output from the A/D converter 12 into a variable-length code, an error-correcting code adding circuit 16 for adding an error-correcting code to an output from the variable-length coding circuit 14, and a Sync.ID adding circuit 18 for forming an output from the error-correcting code adding circuit 16 into synchronized blocks and adding a synchronizing code Sync for synchronization detection and identification information ID to each of the synchronized blocks. The identification information ID includes the addresses of image information, such as a frame number and a line number, compression parameters (such as a compression ratio) and so forth.

The arrangement shown in FIG. 1 also includes a modulation circuit 20 for subjecting an output from the Sync.ID adding circuit 18 to suppressed low-frequency modulation such as 8-10 conversion or 8-14 conversion, a recording amplifier 22 for amplifying an output from the modulation circuit 20, a switch 24 which is connected to a contact "a" if a recording mode is selected, or to a contact "b" if a reproduction mode is selected, in response to a control signal from a system controlling circuit 41 which will be described later, and a recording/reproducing magnetic head 26. A magnetic tape 28 is used as a recording medium.

The arrangement shown in FIG. 1 also includes a reproducing amplifier 30, a demodulation circuit 32 corresponding to the modulation circuit 20, a Sync.ID detecting circuit 34 for detecting the synchronizing code Sync and the identification information ID, an error correcting circuit 36 for performing error correction of a data part supplied from the Sync.ID detecting circuit 34 on the basis of an error correcting code, a variable-length code decoding circuit 38 for decoding variable-length coded image data subjected to the error correction by the error correcting circuit 36, a D/A converter 40 for converting a digital reproduced image signal outputted from the variable-length code decoding circuit 38 into an analog signal, and an output terminal 42 through which an analog reproduced image signal outputted from the D/A converter 40 is outputted to an external circuit.

The arrangement shown in FIG. 1 also includes an amount-of-data detecting circuit 44 for detecting the amount of data (the amount of data to be recorded) indicative of an old image to be replaced with a new image by insert-recording on the magnetic tape 28, in accordance with the synchronizing code Sync and the identification information ID which have been detected by the Sync. ID detecting circuit 34. The shown arrangement also includes a compression-ratio setting circuit 46 for setting a compression ratio used for setting a parameter of the variable-length coding circuit 14 so that the amount of data to be newly recorded does not exceed the detected amount of data, in accordance with the amount of data detected by the amount-of-data detecting circuit 34.

As will be described later in detail, during normal recording, the variable-length coding circuit 14 is separated from the compression-ratio setting circuit 46 so that it codes image data supplied from the A/D converter 12 at an independent compression ratio. During insert-recording, the variable-length coding circuit 14 codes image data supplied from the A/D converter 12 at a compression ratio according to the parameter set by the compression-ratio setting circuit 46.

The shown arrangement also includes a system controlling circuit 41 for controlling each part, an operating device 43 including operating keys such as a key for specifying an operating mode such as "record", "reproduce" or "insert", and a key for specifying a portion on which an image is to be recorded by insert-recording. The shown arrangement also includes a capstan 49 for transporting the magnetic tape 28, a capstan controlling circuit 45 for driving the capstan 49 in accordance with a control signal from the system controlling circuit 41, and an FG generator 47 for generating a frequency signal (hereinafter referred to as "FG signal") corresponding to the rotational frequency of the capstan 49.

First of all, a normal recording/reproduction operation will be described in brief below. The A/D converter 12 digitizes an analog image signal inputted through the input terminal 10, and the variable-length coding circuit 14 executes variable-length coding of the output data of the A/D converter 12 in accordance with a predetermined parameter. The error-correcting code adding circuit 16 adds an error correcting code based on, for example, a double-coding Reed-Solomon code to the output from the variable-length coding circuit 14. The Sync.ID adding circuit 18 forms the output from the error-correcting code adding circuit 16 into synchronized blocks each containing a predetermined number of data, adds to each of the synchronized blocks the synchronizing code Sync for synchronization detection and the identification information ID which consists of addresses, compression parameters and so forth, and outputs the resultant block to the modulation circuit 20. The modulation circuit 20 subjects the output from the Sync-ID adding circuit 18 to suppressed low-frequency modulation. The output from the modulation circuit 20 is applied to the magnetic head 26 through the recording amplifier 22 and the switch 24 so that the output is recorded on the magnetic tape 28.

An operation for normal reproduction will be described below. A signal recorded on the magnetic tape 28 is reproduced by the magnetic head 26, and the output from the magnetic head 28 is applied to and demodulated by the demodulation circuit 32 through the switch 24 and the reproducing amplifier 30. The Sync.ID detecting circuit 34 detects the identification information ID, variable-length coded image data and the associated error correcting code from the output from the demodulation circuit 32 by means of the synchronizing code Sync, and supplies the variable-length coded image data and the associated error correcting code to the error correcting circuit 36. The error correcting circuit 36 corrects the code error of the variable-length coded image data in accordance with the error correcting code, and the variable-length code decoding circuit 38 decodes the variable-length coded image data and outputs the thus-obtained original digital image signal. The D/A converter 40 converts the output from the variable-length code decoding circuit 38 into an analog signal. The reproduced image signal obtained in this manner is outputted to an external circuit through the output terminal 42.

Figure 2:
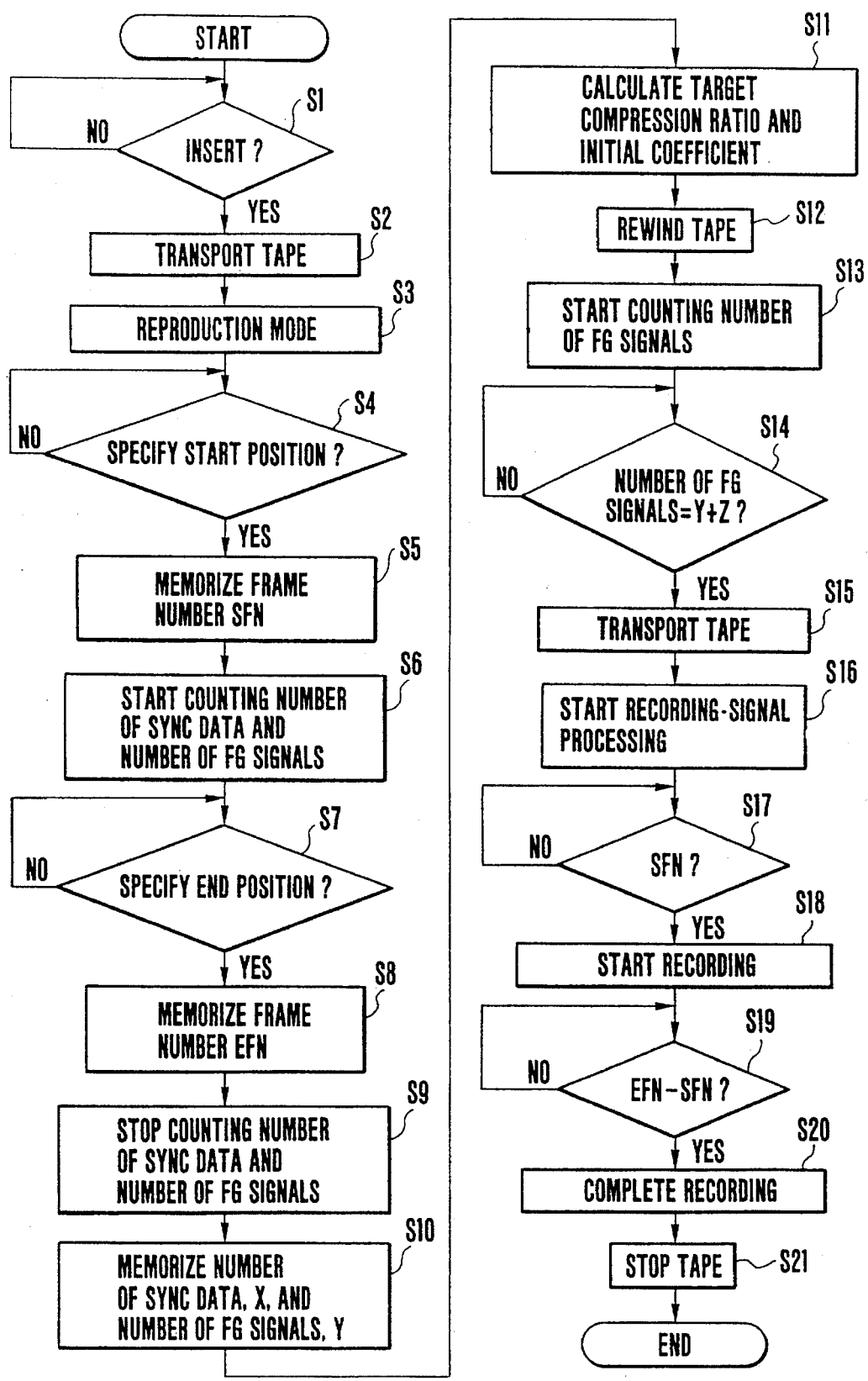
FIG. 2 is a flowchart showing operational steps which are executed by the apparatus of FIG. 1 during an insert-recording.

FIG. 2 is a flowchart showing operational steps which are executed by the system controlling circuit 41 during the insert-recording according to the first embodiment of the present invention. The operation of the insert-recording will be described below with reference to FIG. 2.

If the system controlling circuit 41 receives an insert-recording command from the operating device 43 (Step S1), the system controlling circuit 41 causes the capstan controlling circuit 45 to rotate the capstan 49 in a forward direction, thereby transporting the tape 28 in the forward direction (Step S2). Furthermore, the system controlling circuit 41 selects the reproduction mode and connects the switch 24 to the contact "b" (Step S3).

When the reproduction mode is selected, it is possible to specify the start position of the insert-recording through an area-specifying key of the operating device 43 (Step S4). If the start position of the insert-recording is specified, the amount-of-data detecting circuit 44 memorizes, as a frame number SFN, a frame number contained in identification information ID which is initially reproduced after the start position has been specified (Step S5). In addition, the amount-of-data detecting circuit 44 starts counting the number of the synchronizing data Sync (Step S6). The system controlling circuit 41 starts counting the number of FG signals by means of its internal counter (Step S6).

Then, if the area-specifying key is operated in the above-described state, the end position of the insert-recording is specified (Step S7). When the end position of the insert-recording is specified, the amount-of-data detecting circuit 44 memorizes, as a frame number EFN, a frame number contained in identification information ID which is initially reproduced after the end position has been specified (Step S8). In addition, the amount-of-data detecting circuit 44 stops counting the number of the synchronizing data Sync (Step S9). The system controlling circuit 41 also stops counting the number of the FG signals by means of the internal counter (Step S9). The number of the counted synchronizing data and the number of the counted FG signals are stored in an internal memory of the system controlling circuit 41 as a count value X and a count value Y, respectively (Step S10).

The compression-ratio setting circuit 46 calculates a target compression ratio on the basis of the count value X and the frame numbers SFN and EFN (Step S11). The first embodiment is based on the premise that the number of frames of a new image signal to be insert-recorded is made coincident with the number of frames of an image signal to be rewritten. Therefore, the allowable number of data (the number of synchronizing blocks) per frame of the new image signal is given by X/(EFN-SFN). More specifically, if B represents the number of data (the number of synchronizing blocks) per frame before compression, the target compression ratio is given by $X/\{B(EFN-SFN)\}$.

As will be described later, in the first embodiment, the target compression ratio and an initial coefficient, which is calculated as a quantizing parameter relative to an average image which is used for achieving the target compression ratio in a manner which will be described later in detail, are supplied to the variable-length coding circuit 14.

Then, the system controlling circuit 41 rewinds the tape 28 by means of the capstan 49 (Step S12), and restarts counting the number of FG signals by means of the aforementioned internal counter (Step S13). If the resultant count value coincides with a number obtained by adding a predetermined value Z to the count value Y, it is determined that the tape 28 has been rewound from the start position of the insert-recording by a predetermined amount, and the tape 28 is reversed and transported in the forward direction (Step S15).

Since a particular time is required to process a recording signal, the system controlling circuit 41 starts recording-signal processing before the variable-length coding circuit 14 starts recording (Step S16), and supplies the variable-length coding circuit 14 with a control signal * which causes it to execute processing for insert-recording. The identification information ID is reproduced, and if the frame number SFN in the reproduced identification information ID is reached (Step S17), actual recording is started. If the number of frames of an image signal which is being recorded reaches (EFN-SFN) (Step S19), the recording is completed (Step S20). Then, the system controlling circuit 41 stops the tape 28 (Step S21) and brings the process to an end.

Figure 3:
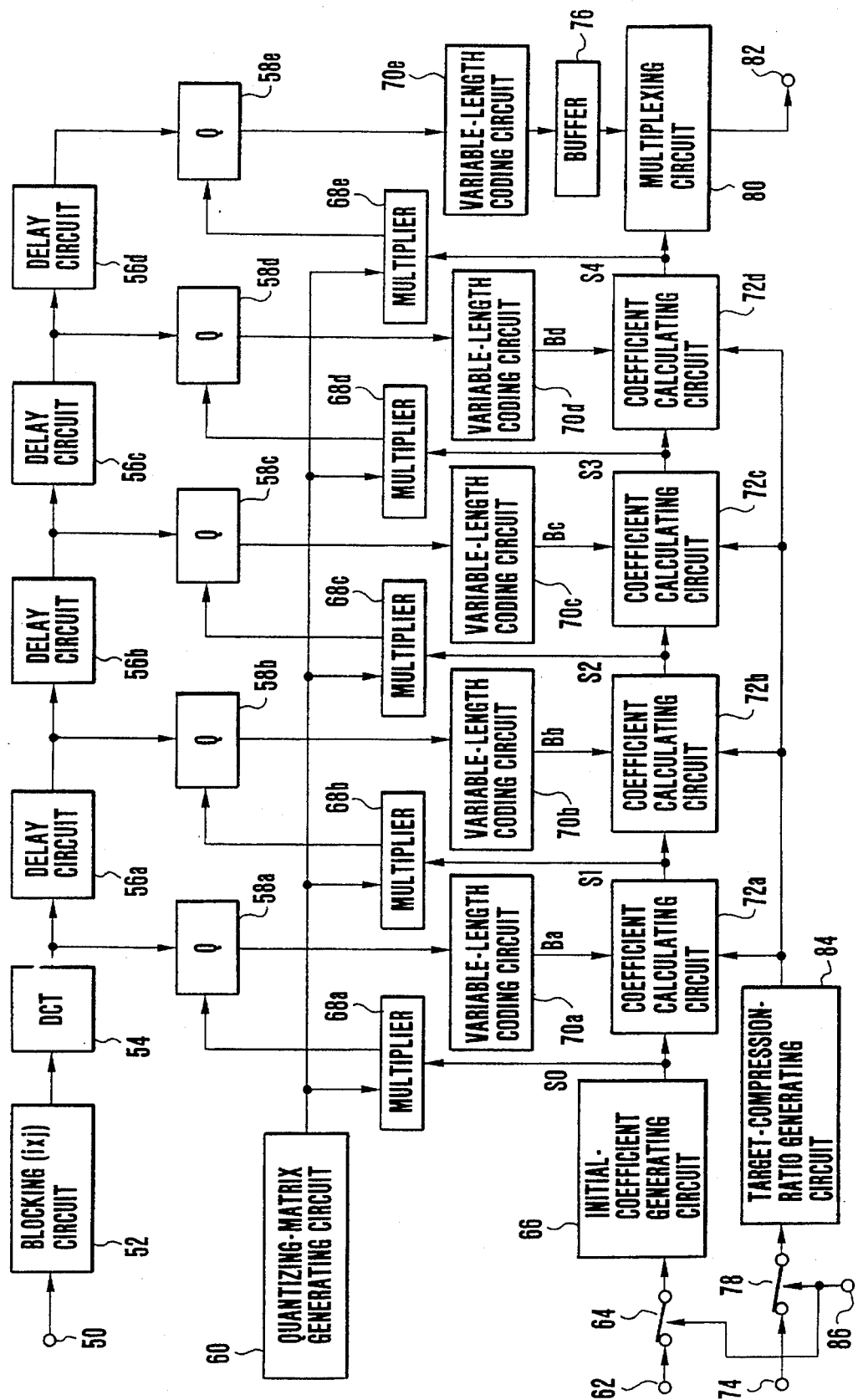
FIG. 3 is a block diagram showing a specific arrangement exampling of a variable-length coding circuit used in the apparatus of FIG. 1.

One example of the variable-length coding circuit 14 is shown in FIG. 3. FIG. 3 is a block diagram showing a circuit arrangement in which discrete cosine transform (DCT) and variable-length coding are combined.

The example shown in FIG. 3 includes an input terminal 50 through which image data is inputted from the A/D converter 12, a blocking circuit 52 for forming raster-scan image data inputted through the input terminal 50 into blocks each having ixj pixels, and a DCT circuit 54 for transforming an output from the blocking circuit 52 into a frequency domain by discrete cosine transform.

The shown example also includes delay circuits 56a, 56b, 56c and 56d for delaying an output from the DCT circuit 54 on a step-by-step basis by a predetermined time (for example, several to some tens of frames), quantizing circuits 58a, 58b, 58c, 58d and 58e for respectively quantizing outputs from the DCT circuit 54 and the delay circuits 56a, 56b, 56c and 56d, and a quantizing-matrix generating circuit 60 for generating element values Xij on which the quantizing coefficients of the respective quantizing circuits 58a, 58b, 58c, 58d and 58e are based.

The shown example also includes an input terminal 62 through which a quantizing parameter (initial coefficient) from the compression-ratio setting circuit 46 is inputted, a switch 64 which is off during normal recording and is turned on if the insert-recording is selected, and an initial-coefficient generating circuit 66 for generating an initial value S0 of a parameter which determines the quantizing characteristic of each of the quantizing circuits 58a, 58b, 58c, 58d and 58e. If the switch 64 is closed, the initial-coefficient generating circuit 66 outputs an initial coefficient inputted through the input terminal 62, while if the switch 64 is open, the initial-coefficient generating circuit 66 outputs an internally held, initial coefficient. The aforementioned control signal * is inputted through a terminal 86.

The shown example also includes an input terminal 74 through which a target compression ratio from the compression-ratio setting circuit 46 is inputted, a switch 78 which is turned off if the normal recording is selected, and is turned on if the insert-recording is selected, in accordance with the control signal * inputted through the terminal 86, and a target-compression-ratio generating circuit 84 for generating a target compression ratio for each coefficient calculating circuit 72a, 72b, 72c and 72d which will be described later. During the insert-recording in which the switch 78 is on, the target-compression-ratio generating circuit 84 outputs a target compression ratio inputted through the input terminal 74, while, during the normal recording in which the switch 78 is off, the target-compression-ratio generating circuit 84 outputs an internally memorized, target compression ratio.

The shown example also includes a multiplier 68a for multiplying the output Xij from the quantizing-matrix generating circuit 60 by the coefficient S0 outputted from the initial-coefficient generating circuit 66 and applying the multiplication result to the quantizing circuit 58a, a variable-length coding circuit 70a for encoding an output from the quantizing circuit 58a into a variable-length code and outputting the variable-length code and the amount of information thereof, Ba, and a coefficient calculating circuit 72a for calculating a coefficient S1 used for achieving a compression ratio higher than and as close as possible to the target compression ratio, from the target compression ratio, the initial coefficient S0 supplied from the initial-coefficient generating circuit 66, and the amount of information, Ba, supplied from the variable-length coding circuit 70a.

The shown example also includes a multiplier 68b for multiplying the output Xij from the quantizing-matrix generating circuit 60 by the coefficient S1 outputted from the coefficient calculating circuit 72a, a variable-length coding circuit 70b for encoding an output from the quantizing circuit 58b into a variable-length code and outputting the amount of information, Bb, resulting from the variable-length coding, and a coefficient calculating circuit 72b for calculating a coefficient S2 used for a compression ratio higher than and as close as possible to the target compression ratio, from the coefficient S1 supplied from the coefficient generating circuit 72a, the target compression ratio supplied from the initial-coefficient generating circuit 66, and the amount of information, Bb, supplied from the variable-length coding circuit 70b.

The shown example further includes multipliers 68c, 68d and 68e for respectively multiplying the output Xij from the quantizing-matrix generating circuit 60 by coefficients S2, S3 and S4 outputted from the coefficient calculating circuits 72b, 72c and 72d, variable-length coding circuits 70c and 70d for respectively encoding outputs from the quantizing circuits 58c and 58d into variable-length codes and outputting the amounts of information, Bc, and, Bd, resulting from the variable-length coding, a variable-length coding circuit 70e for encoding an output from the quantizing circuit 58e into a variable-length code and outputting the variable-length code, and coefficient calculating circuits 72c and 72d for respectively calculating coefficients S3 and S4 used for achieving compression ratios each higher than and as close as possible to the target compression ratio, from the coefficients S2 and S3 supplied from the coefficient generating circuits 72b and 72c, the target compression ratio supplied from the initial-coefficient generating circuit 66, and the amounts of information, Be, and, Bd, supplied from the variable-length coding circuits 70c and 70d.

The shown example also includes a buffer 76 for the variable-length code outputted from the variable-length coding circuit 70e, a multiplexing circuit 80 for multiplexing the variable-length code outputted from the buffer 76 with the coefficient S4 outputted from the coefficient calculating circuit 72d, and an output terminal 82 connected to the error-correcting code adding circuit 16 shown in FIG. 1.

In the circuit shown in FIG. 3, during either of the normal recording and the insert-recording, the coefficients S0, S1, S2, S3 and S4, which respectively control the quantizing characteristics of the quantizing circuits 58a, 58b, 58c, 58d and 58e which are connected in a multistage manner, are sequentially altered to determine the associated coefficients used for achieving compression ratios each higher than and as close as possible to the target compression ratio supplied from the compression-ratio setting circuit 46, and variable-length codes corresponding to the individual coefficients are sequentially outputted. During the normal recording, the initial coefficient S0 and the target compression ratio are set values which are respectively memorized in the initial-coefficient generating circuit 66 and the target-compression-ratio generating circuit 84, whereas, during the insert-recording, the initial coefficient S0 and the target compression ratio are inputted from the compression-ratio setting circuit 46.

First, the operation of the insert-recording will be described in detail below. During the insert-recording, the switches 64 and 78 are closed. The blocking circuit 52 converts raster-scan image data inputted through the input terminal 50 (from the A/D converter 12) into a sequence of blocks each having ixj pixels, and the DCT circuit 54 transforms the image data blocked by the blocking circuit 52 into a frequency domain by discrete cosine transform, thereby outputting a conversion coefficient of ixj matrix.

The initial coefficient S0 and the target compression ratio, which are respectively inputted from the compression-ratio setting circuit 46 to the input terminals 62 and 74, are respectively inputted into the initial-coefficient generating circuit 66 and the target-compression-ratio generating circuit 84 through the switches 64 and 78. The initial-coefficient generating circuit 66 supplies the initial coefficient S0 inputted through the input terminal 62 to the multiplier 68a and to the coefficient calculating circuit 72a. The target-compression-ratio generating circuit 84 supplies the target compression ratio inputted through the input terminal 74 to each of the coefficient calculating circuits 72a, 72b, 72c and 72d.

The multiplier 68a multiplies the quantizing coefficient Xij generated from the quantizing-matrix generating circuit 60 by the initial coefficient S0, and the quantizing circuit 58a quantizes the output from the DCT circuit 54 on the basis of a quantizing characteristic corresponding to XijxS0. If the initial coefficient S0 is made larger, the amount of information obtainable by compression becomes smaller, while if the initial coefficient S0 is made smaller, the amount of information obtainable by compression becomes larger. The variable-length coding circuit 70a encodes the output from the quantizing circuit 58a into a variable-length code and outputs the amount of information, Ba, resulting from the variable-length coding to the coefficient calculating circuit 72a.

The coefficient calculating circuit 72a generates the coefficient S1 from the initial coefficient S0 supplied from the initial-coefficient generating circuit 66, the target compression ratio and the amount of information, Ba, and supplies the coefficient S1 to the multiplier 68b and to the coefficient calculating circuit 72b. In this case, if the amount of information, Ba, is larger than a target value, the coefficient calculating circuit 72a generates the coefficient S1 having a value larger than the initial coefficient S0, while, if the amount of information, Ba, is smaller than the target value, the coefficient calculating circuit 72a generates the coefficient S1 having a value smaller than the initial coefficient S0.

The delay circuit 56a delays the output from the DCT circuit 54 by a time equivalent to the processing time required for processing to be executed by the quantizing circuit 58a, the variable-length coding circuit 70a and the coefficient calculating circuit 72a, and applies the delayed output to the quantizing circuit 58b and to the delay circuit 56b.

The multiplier 68b multiplies the quantizing coefficient Xij generated from the quantizing-matrix generating circuit 60 by the initial coefficient S1 supplied from the coefficient calculating circuit 72a, and the quantizing circuit 58b quantizes the output from the delay circuit 56a (the output from the DCT circuit 54) on the basis of a quantizing characteristic corresponding to XijxS1. If the initial coefficient S1 is made larger, the amount of information resulting from compression becomes smaller, while if the initial coefficient S1 is made smaller, the amount of information resulting from compression becomes larger. The variable-length coding circuit 70b encodes the output from the quantizing circuit 58b into a variable-length code and outputs the amount of information, Bb, resulting from the variable-length coding to the coefficient calculating circuit 72b.

The coefficient calculating circuit 72b generates the coefficient S2 from the initial coefficient S1 supplied from the coefficient generating circuit 72a, the target compression ratio supplied from the target-compression-ratio generating circuit 84, and the amount of information, Bb, and supplies the coefficient S2 to the multiplier 68c and to the coefficient calculating circuit 72c. In this case, if the amount of information, Bb, is larger than the target value, the coefficient calculating circuit 72b generates the coefficient S2 having a value larger than the coefficient S1, while, if the amount of information, Bb, is smaller than the target value, the coefficient calculating circuit 72b generates the coefficient S2 having a value smaller than the initial coefficient S1.

Subsequently, quantization and variable-length coding each of which is based on the coefficients S2 and S3 are similarly conducted, and the coefficient calculating circuit 72d finally generates the coefficient S4 which achieves the compression ratio at which a desired image can be completely recorded in an area where an old image is recorded. The quantizing circuit 58e quantizes the output from the DCT circuit 54 on the basis of a quantizing table of XijxS4, and the variable-length coding circuit 70e encodes the output from the quantizing circuit 58e into a variable-length code.

The code output from the variable-length coding circuit 70e is supplied to the buffer 76. The buffer 76 makes a rate adjustment relative to a predetermined recording rate, and also inserts dummy data into an empty data part and outputs the resultant data to the multiplexing circuit 80. The coefficient S4 outputted from the coefficient calculating circuit 72d is also applied to the multiplexing circuit 80. The multiplexing circuit 80 multiplexes them and provides a multiplexed output to the output terminal 82, that is, to the error-correcting code adding circuit 16 (refer to FIG. 1).

In the above-described operation, it is possible to set the compression ratio of a new image for a predetermined unit time to the lowest compression ratio at which a compressed new image can be accommodated in the area where an old image is recorded. Accordingly, it is possible to effect insert-recording without destructing image information which is recorded in the succeeding area.

The operation of the normal recording will be described below. During the normal recording, the switches 64 and 78 are off. The blocking circuit 52 converts raster-scan image data inputted through the input terminal 50 (from the A/D converter 12) into a sequence of blocks each having ixj pixels, and the DCT circuit 54 transforms the image data blocked by the blocking circuit 52 into a frequency domain by discrete cosine transform, thereby outputting a conversion coefficient.

The initial-coefficient generating circuit 66 generates an internal set value (for example, 1) as the initial coefficient S0 and supplies it to the multiplier 68a and to the coefficient calculating circuit 72a. The multiplier 68a multiplies the quantizing coefficient Xij generated from the quantizing-matrix generating circuit 60 by the initial coefficient S0, and the quantizing circuit 58a quantizes the output from the DCT circuit 54 on the basis of a quantizing characteristic corresponding to XijxS0. The variable-length coding circuit 70a encodes the output from the quantizing circuit 58a into a variable-length code and outputs the amount of information, Ba, resulting from the variable-length coding to the coefficient calculating circuit 72a.

The subsequent operations are similar to those explained above in connection with the insert-recording, except that the target compression ratio supplied to each of the coefficient calculating circuits 72a, 72b, 72c and 72d is an internal set value memorized in the target-compression-ratio generating circuit 84. Similarly to the insert-recording, the multiplexing circuit 80 multiplexes the output from the variable-length coding circuit 70e with the coefficient S4, and provides a multiplexed output to the output terminal 82, that is, to the error-correcting code adding circuit 16 (refer to FIG. 1).

In the circuit shown in FIG. 3, the quantizing circuits 58a to 58e and the variable-length coding circuits 70a to 70e are connected in a multistage manner. In this circuit arrangement, it is necessary that the output code from the variable-length coding circuit 70e be made to completely achieve a compression ratio higher than the target compression ratio. Therefore, it may be necessary to set a coefficient which ensures a considerably high compression ratio in the stage of the coefficient calculating circuit 72d, depending upon the contents of the coefficient calculation performed by each of the coefficient calculating circuits 72a to 72d. To prevent such necessity, the operations of the coefficient calculating circuits 72a to 72d may be replaced with loop computations performed by a microcomputer, and the microcomputer may be repeatedly operated so that an optimum compression ratio can be obtained. In this case, although an image memory for storing image data for one picture is needed, the number of stages of quantizing and variable-length coding circuits can be reduced to one, respectively.

The quantizing circuits 58a to 58e and the variable-length coding circuits 70a to 70e may also be arranged in parallel, respectively, so that it is possible to select a compression code indicative of a compression ratio higher than and closest to a target compression ratio by simultaneously executing quantizing and variable-length coding on the basis of a plurality of coefficients S0 to S4 corresponding to the target compression ratio.

In other words, the coding circuit shown in FIG. 3 is merely one example, and a variety of arrangements can be adopted as the circuit arrangement of the variable-length coding circuit 14 which realizes the embodiment, shown in FIG. 1, of the present invention. The circuit arrangement of the variable-length coding circuit 14 is, therefore, not limited to the circuit example of FIG. 3. In the circuit of FIG. 3 or the modification just described, the compression ratio may be feedback-controlled on the basis of the amount of data in the buffer 76.

Although the example in which a magnetic tape is used as a recording medium has been described above, it is a matter of course that an arrangement which uses a magnetic disk, an optical disk, an opto-magnetic disk, a solid-state memory or other similar recording media is encompassed within the scope of the present invention.

In the above-described embodiment, the number of frames of an image signal to be rewritten is made coincident with the number of frame numbers of an image signal to be newly recorded, but these numbers need not necessarily be made coincident. More specifically, although in the above-described embodiment the target compression ratio is given by X/{B(EFN-SFN)}, if the number of frames of an image signal to be newly recorded is represented by P, the target compression ratio can be set as X(BxP) by manually inputting the number of frames, P, through the operating part 43. If this is done, it is possible to replace an image of specified time length with an image of time length which differs from the specified time length.

As is readily understood from the above description, in the apparatus according to the abovedescribed embodiment, it is possible to rewrite a signal compressed by variable-length coding with another compressed signal without accidental data destruction on a recording medium.

A second embodiment of the present invention will be described below.

Figure 4:
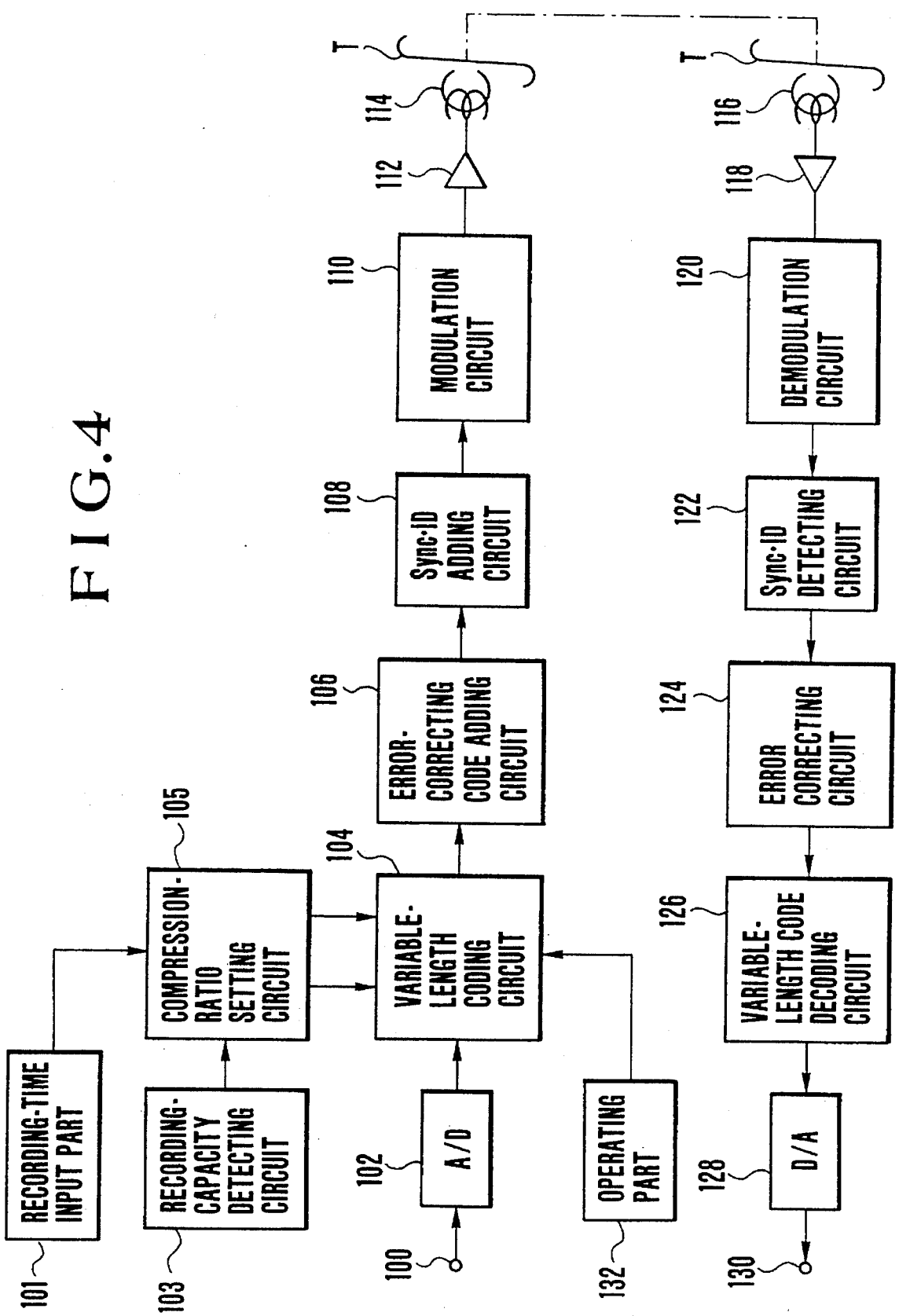
FIG. 4 is a block diagram schematically showing the entire arrangement of an information recording apparatus according to another embodiment of the present invention.

FIG. 4 is a block diagram showing the arrangement of a digital VTR which is a recording apparatus according to the second embodiment of the present invention. In FIG. 4, the upper part represents a compressed-signal recording apparatus for encoding an image signal into a variable-length code and recording the variable-length code or a compressed signal on a magnetic tape T, while the lower part represents an apparatus for reproducing the compressed signal. If recording is to be performed, the time length of video information to be newly recorded is inputted to a compression-ratio setting circuit 105 through a recording-time input part 101 by a manual operation. In the meantime, a recording-capacity detecting circuit 103 detects the available recording capacity of the magnetic tape T by finding the remaining recording capacity thereof from, for example, the diameter of the magnetic tape T wound around a reel, and the compression-ratio setting circuit 105 calculates a target compression ratio and the aforesaid initial coefficient according thereto by comparing the remaining recording capacity of the tape T with the time length of information inputted through the recording-time input part 101, that is, the amount of information before compression, which is to be recorded in a compressed state. The thus-calculated target compression ratio and initial coefficient are set in the variable-length coding circuit 104.

The target compression ratio is a compression ratio which satisfies the relationship of "the available recording capacity (i.e., the remaining capacity) of magnetic tape"="the amount of information after compression", and serves as a value for setting the compression parameter of the variable-length coding circuit 104. The variable-length coding circuit 104 executes compression on the basis of the target compression ratio by using a parameter which satisfies the relationship of "the available recording capacity (i.e., the remaining capacity) of the magnetic tape T"≧"the amount of information after compression". The arrangement of the variable-length coding circuit 104 may be similar to that shown in FIG. 3.

After the target compression ratio has been set through the above-described operation, a recording operation is started.

An image signal is inputted through an input terminal 100, then converted into digital data by an A/D converter 102, and then compressed by coding in the variable-length coding circuit 104 on the basis of the parameter set in the above-described manner. To cope with an error which may occur during recording or reproduction, an error correcting code is added to the coded data by an error-correcting code adding circuit 106. Then, a synchronizing signal and an ID signal which are required for recording and reproduction are added by a synchronizing signal-identification signal (Sync.ID) adding circuit 108. The ID signal includes various data, such as addresses and compression parameters, about image information carried by the image signal. In a modulation circuit 110, the image information is subjected to modulation having the effect of suppressing a low-frequency component, such as 8-14 conversion or 8—8 conversion. The thus-modulated image information is amplified by a recording amplifier 112 and is then recorded on the magnetic tape T by a recording head 114.

During reproduction, image information recorded on the magnetic tape T is reproduced by a reproducing head 116. The reproduced signal is amplified by a reproducing amplifier 118, and the amplified, reproduced signal is demodulated by a demodulation circuit 120. A synchronizing signal and an ID signal are detected from the demodulated image information by a Sync.ID detecting circuit 122, and an error which occurs during recording or reproduction is corrected by an error correcting circuit 124. In a variable-length code decoding circuit 126, the compressed information whose error has been corrected is decoded and expanded on the basis of a compression parameter contained in the ID signal detected by the Sync.ID detecting circuit 122. The restored image information is converted into an analog signal by a D/A converter 128, and the analog signal is outputted through an output terminal 130 as an image signal.

According to the above-described embodiment, the recording-capacity detecting circuit 103 detects the remaining recording capacity of the magnetic tape T on the basis of, for example, the diameter of the magnetic tape T wound around a reel, and the compression-ratio setting circuit 105 calculates a target compression ratio by comparing the remaining recording capacity of the magnetic tape T with the time length of the image inputted through the recording-time input part 101. The variable-length coding circuit 104 executes compression on the basis of the target compression ratio by using the parameter which satisfies the relationship of "the available recording capacity (i.e., the remaining capacity) of the magnetic tape T"≧"the amount of information after compression". Accordingly, it is possible to achieve efficient and high-quality recording of variable-length coded information on the magnetic tape T of fixed recording capacity.

The above-described embodiment is arranged so that a target compression ratio is set once at the start of a recording operation. This setting operation may be executed at predetermined time intervals during recording to correct the target compression ratio at any time.

As is apparent from the foregoing description, according to the embodiment shown in FIG. 4, in a recording apparatus for compressing an information signal by variable-length coding and recording the compressed information signal on a recording medium, it is possible to achieve efficient and high-quality recording of variable-length coded data in a particular area on a recording medium of fixed recording capacity.

What is claimed is:

1. An information recording apparatus comprising:

(a) inputting means for inputting information;

(b) quantizing means for quantizing the information inputted by said inputting means;

(c) coding means for coding the information quantized by said quantizing, means, (d) generating means for generating first information relative to an amount of the information inputted by said inputting means;

(e) detecting means for detecting an available recording capacity of a recording medium;

(f) controlling means for controlling a quantizing step of said quantizing means in accordance with an output of said generating means and an output of said detecting means; and (g) recording means for recording the information coded by said coding means on a recording medium.

2. An apparatus according to claim 1, wherein said generating means includes manual operating means for inputting, as the first information, a time length of the information to be recorded.

3. An apparatus according to claim 1, wherein said detecting means detects a remaining recording capacity of the recording medium.

4. An apparatus according to claim 1, wherein said coding means performs variable-length coding.

5. An apparatus according to claim 4, wherein the information includes image information and said quantizing means includes transforming means for performing orthogonal transformation of the image information.

6. An information recording apparatus comprising:
   (a) inputting means for inputting image information;
   (b) coding means for coding the image information inputted by said inputting means, said coding means compressing the image information at a compression ratio which is variable;
   (c) generating means for generating first information relative to an amount of the image information inputted by said inputting means, wherein said generating means includes manual operating means for inputting, as the first information, the number of frames of the image information to be recorded;
   (d) detecting means for detecting an available recording capacity of a recording medium;
   (e) controlling means for controlling the compression ratio of said coding means in accordance with an output of said generating means and an output of said detecting means; and
   (f) recording means for recording the image information coded by said coding means on a recording medium.

7. An information recording apparatus comprising:
   (a) inputting means for inputting image information;
   (b) coding means for coding the image information inputted by said inputting means, said coding means compressing the image information at a compression ratio which is variable;
   (c) generating means for generating first information relative to an amount of the image information inputted by said inputting means;
   (d) specifying means for specifying a rewriting area to be rewritten on a recording medium,
   (e) detecting means for detecting the number of frames of image information recorded in the rewriting area and outputting second information relative to a detected number of frames;
   (f) controlling means for controlling the compression ratio of said coding means in accordance with an output of said generating means and an output of said detecting means; and
   (g) recording means for recording the image information coded by said coding means on a recording medium.

8. An information recording apparatus comprising:
   (a) inputting means for inputting image information;
   (b) coding means for coding the image information inputted by said inputting means, said coding means compressing the image information at a compression ratio which is variable;
   (c) generating means for generating first information relative to an amount of the image information inputted by said inputting means;
   (d) specifying means for specifying a rewriting area to be rewritten on a recording medium,
   (e) detecting means for detecting the number of synchronizing data of image information recorded in the rewriting area and outputting second information relative to a detected number of synchronizing data;
   (f) controlling means for controlling the compression ratio of said coding means in accordance with an output of said generating means and an output of said detecting means; and
   (g) recording means for recording the image information coded by said coding means on a recording medium.

9. An image information recording apparatus comprising:
   (a) inputting means for inputting image information;
   (b) coding means for coding the image information inputted by said inputting means, said coding means compressing the image information at a compression ratio which is variable and outputting the compressed image information;
   (c) recording means for recording the compressed image information outputted from said coding means on a recording medium;
   (d) specifying means for specifying a rewriting area to be rewritten on the recording medium; and
   (e) controlling means for controlling the compression ratio of said coding means in accordance with a length of the rewriting area specified by said specifying means.

10. An apparatus according to claim 9, further comprising manual operating means for inputting time information relative to a recording time of the image information to be recorded, and wherein said controlling means controls the compression ratio of said coding means in accordance with a length of the rewriting area and the time information.

11. An apparatus according to claim 9, wherein said coding means performs variable-length coding.

12. An apparatus according to claim 11, wherein said coding means encodes transformed information obtained by orthogonal transformation of the image information into a variable-length code.

13. An apparatus according to claim 12, wherein said coding means includes quantizing means for quantizing the transformed information, said controlling means controlling a quantizing coefficient of said quantizing means in accordance with the length of the rewriting area.

14. An information recording apparatus comprising:
   (a) inputting means for inputting image information;
   (b) quantizing means for quantizing the image information inputted by said inputting means;
   (c) coding means for coding the image information quantized by said quantizing means;
   (d) recording means for recording the image information coded by said coding means on a recording medium;
   (e) detecting means for detecting a remaining recording capacity of the recording medium; and
   (f) controlling means for controlling a quantizing coefficient of said quantizing means in accordance with an output from said detecting means.

15. An information recording apparatus comprising:
   (a) inputting means for inputting image information;
   (b) manual operating means for inputting time information relative to a recording time of the image information to be recorded;
   (c) coding means for coding the image information inputted by said inputting means, said coding means compressing the image information at a compression ratio which is variable;
   (d) recording means for recording the image information coded by said coding means on a recording medium;
   (e) detecting means for detecting a remaining recording capacity of the recording medium; and (f) controlling means for controlling the compression ratio of said coding means in accordance with an output of said detecting means and the time information.

16. An apparatus according to claim 14, wherein said coding means performs variable-length coding.

17. An apparatus according to claim 16, wherein said quantizing means includes transforming means for performing orthogonal transformation of the image information.

18. An image information coding apparatus comprising:
(a) first inputting means for inputting image information;
(b) quantizing means for quantizing the image information inputted by said first inputting means;
(c) coding means for coding the image information quantized by said quantizing means;
(d) second inputting means for inputting information relative to a recording time of the image information; and
(e) controlling means for controlling a quantizing step of said quantizing means in accordance with the information inputted by said second inputting means.

19. An apparatus according to claim 18, wherein said quantizing means includes transforming means for performing orthogonal transformation of the image information.

20. An image information coding apparatus comprising:
a) inputting means for inputting information;
b) quantizing means for quantizing the information inputted by said inputting means;
(c) coding means for coding the information quantized by said quantizing means;
d) detecting means for detecting an available recording capacity of the recording medium for recording the information coded by said coding means; and
e) controlling means for controlling a quantizing step of said quantizing means in accordance with the output of said detecting means.

21. An apparatus according to claim 20, wherein the information includes image information and said quantizing means includes transforming means for performing orthogonal transformation of the image information.

* * * * *

UNITED STATES PATENT AND TRADEMARK OFFICE
CERTIFICATE OF CORRECTION

PATENT NO. : 5,594,598
DATED : January 14, 1997
INVENTOR(S) : Akihiro Shikakura

It is certified that error appears in the above-identified patent and that said Letters Patent are hereby corrected as shown below:

Col. 7, line 38, delete "Be," and insert -- Bc, --.

Signed and Sealed this

Fifth Day of May, 1998

Attest:

BRUCE LEHMAN

*Attesting Officer*        *Commissioner of Patents and Trademarks*

UNITED STATES PATENT AND TRADEMARK OFFICE
CERTIFICATE OF CORRECTION

PATENT NO. : 5,594,598
DATED : January 14, 1997
INVENTOR(S) : Akihiro Shikakura

It is certified that error appears in the above-identified patent and that said Letters Patent is hereby corrected as shown below:

Title page, after item [22]Filed: Oct. 19. 1992, insert-- item [30] Foreign Application Priority Data:

Oct. 24, 1991 [JP] Japan..............................3-305300
Dec. 25, 1991 [JP] Japan..............................3-343583

Signed and Sealed this

Twenty-second Day of September, 1998

Attest:

BRUCE LEHMAN

Attesting Officer          Commissioner of Patents and Trademarks